(12) United States Patent
Cohen et al.

(10) Patent No.: US 9,477,800 B1
(45) Date of Patent: Oct. 25, 2016

(54) SYSTEM, METHOD, AND COMPUTER PROGRAM PRODUCT FOR AUTOMATICALLY SELECTING A CONSTRAINT SOLVER ALGORITHM IN A DESIGN VERIFICATION ENVIRONMENT

(71) Applicant: Cadence Design Systems, Inc., San Jose, CA (US)

(72) Inventors: Daniel Asher Cohen, Los Gatos, CA (US); John LeRoy Pierce, Temple, NH (US); Nir Weiss, San Diego, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/619,629

(22) Filed: Feb. 11, 2015

(51) Int. Cl.
*G06F 17/50* (2006.01)

(52) U.S. Cl.
CPC .................... *G06F 17/505* (2013.01)

(58) Field of Classification Search
CPC ............ G06F 17/504; G06F 17/5009; G06F 17/5081
USPC .................................................. 716/106, 107
See application file for complete search history.

(56) References Cited

U.S. PATENT DOCUMENTS

| | | | |
|---|---|---|---|
| 6,513,144 B1* | 1/2003 | Kim ................. | G01R 31/31834 703/16 |
| 7,757,191 B2* | 7/2010 | Chan ................ | G01R 31/31831 703/16 |
| 7,870,523 B1* | 1/2011 | Uziel ................... | G06F 11/263 703/2 |
| 8,370,273 B2* | 2/2013 | Hung .................... | G06F 17/504 706/12 |
| 8,904,321 B1* | 12/2014 | Cohen ................ | G06F 17/5009 716/106 |
| 9,202,004 B1* | 12/2015 | Cohen ................ | G06F 17/5081 |
| 9,202,005 B2* | 12/2015 | Goswami ............ | G06F 17/5009 |
| 2015/0067622 A1* | 3/2015 | Goswami ............ | G06F 17/5081 716/106 |

* cited by examiner

*Primary Examiner* — Sun Lin
(74) *Attorney, Agent, or Firm* — Holland & Knight LLP; Mark H. Whittenberger, Esq.

(57) ABSTRACT

The present disclosure relates to a computer-implemented method for electronic design verification. Embodiments may include providing, using one or more processors, an electronic design verification environment having a plurality of randomize calls associated therewith. Embodiments can also include selecting one of the plurality of randomize calls for analysis at a constraint solver engine and iteratively analyzing the selected randomize call using a plurality of constraint solver algorithms. Embodiments can also include automatically determining a most effective constraint solver algorithm for the selected randomize call.

17 Claims, 5 Drawing Sheets

SYSTEM, METHOD, AND COMPUTER PROGRAM PRODUCT FOR AUTOMATICALLY SELECTING A CONSTRAINT SOLVER ALGORITHM IN A DESIGN VERIFICATION ENVIRONMENT

FIELD OF THE INVENTION

The present disclosure relates to electronic designs, and more specifically, to a method for automatically selecting a most appropriate constraint solver algorithm to use for each randomize call in a design verification environment.

DISCUSSION OF THE RELATED ART

In the world of electronic design automation ("EDA"), many different approaches have been used in order to verify the operation of an integrated circuit ("IC"). Customers run tens of thousands of simulations to verify their designs. This takes thousands of hours and generates hundreds of gigabytes of data. At the end they are still not sure if they have run enough simulations and have no way to predict how many simulations they need to run before running them. Existing approaches also fail to adequately predict the impact of adding another mode or field on the number of required simulations. Coverage may be manually written to understand how much of the stimulus they need to generate has actually been generated. As random fields and constraint rules are added to their stimulus there is no way to predict the impact on the number of tests they need to run to achieve coverage.

Figure 1:
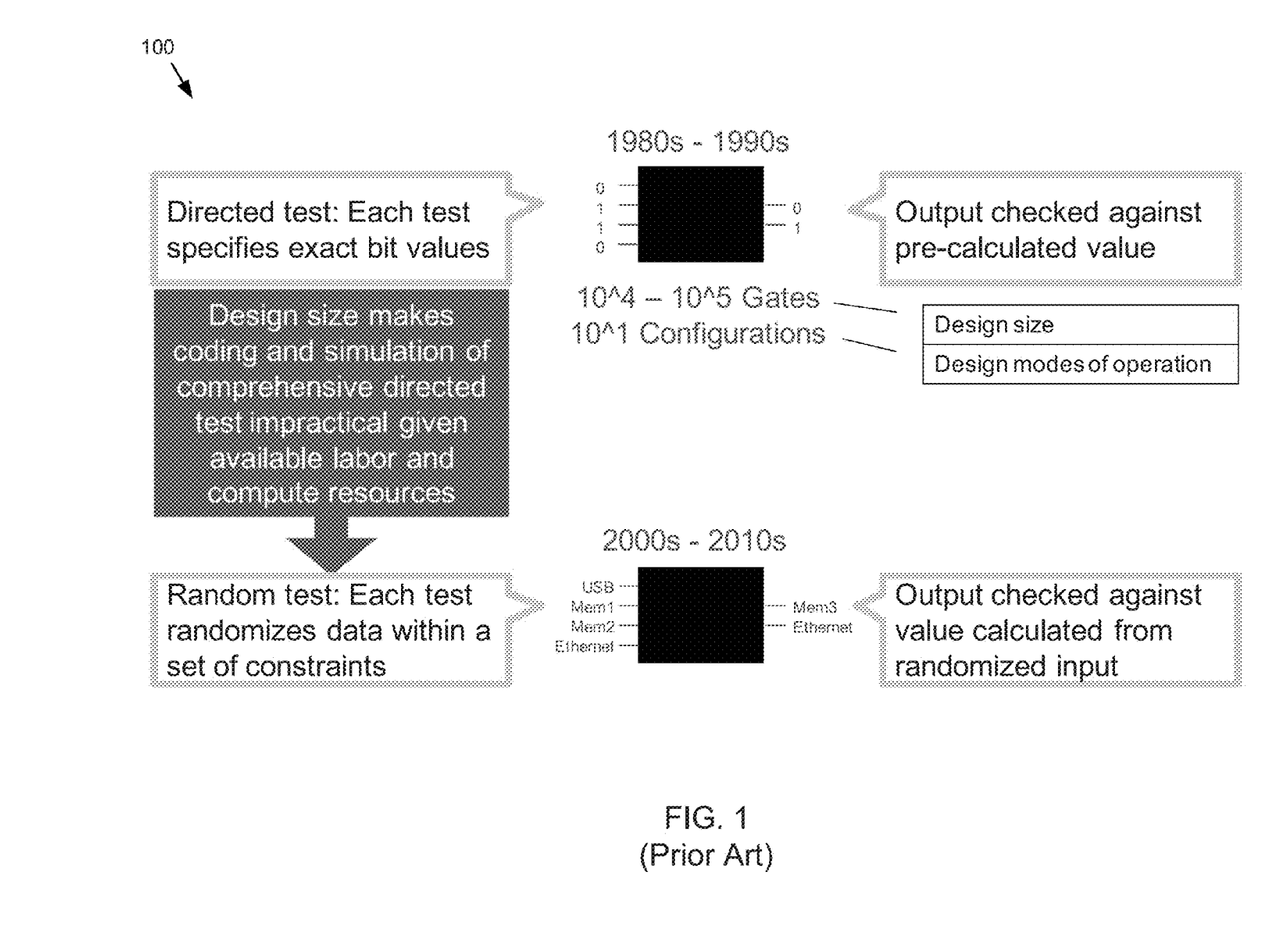
FIG. 1 is a diagram depicting existing CSA selection processes.

Newer methods for IC verification have appeared as IC complexity has increased. In this way, simulation approaches began as a directed test where static tests were configured to provide complete stimulus for every IC function. In time, and as shown in FIG. 1, the transition to randomization revolutionized the way in which testing was performed. Dynamic tests may provide a random stimulus to supply an acceptable subset of input for every IC function. Automatic test pattern generation ("ATPG") supplanted fault simulation when the manual tuning of test vectors became too complex (late 1990s) and hardware verification languages ("HVLs") were developed to support randomized test with constraints, coverage, and classes (early 2000s). These improvements significantly increased the engineer's ability to build tests.

Figure 2:
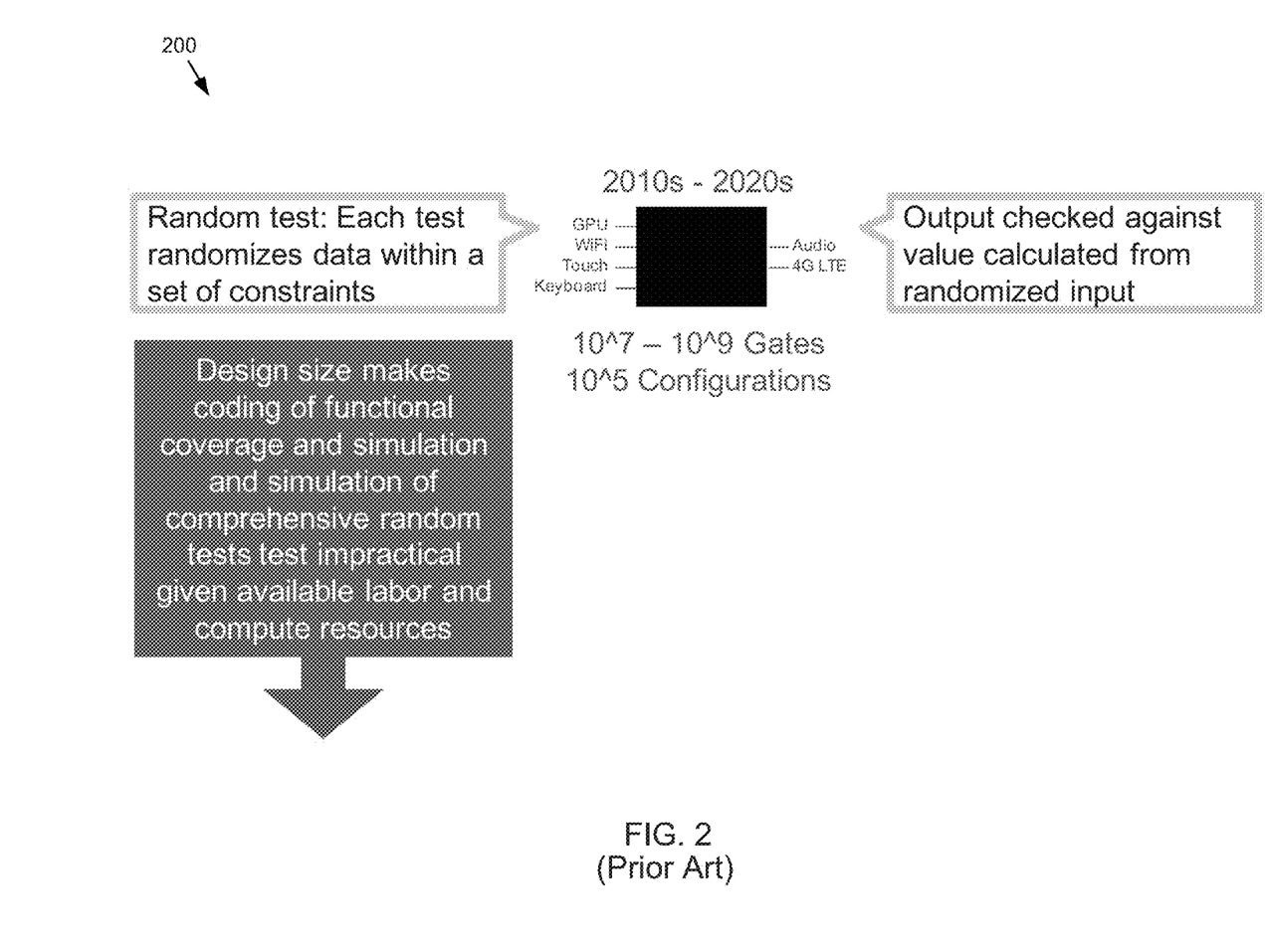
FIG. 2 is a diagram depicting existing CSA selection processes.

As shown in FIG. 2, randomization often has difficulty scaling and is becoming increasingly insufficient as the state space continues to grow exponentially. The current state space is absurdly large (e.g., 1 M register bits=10^300000 number of states, 30K registers @32 bits~1M bits> many chips are already there). Accordingly, verification farms are starting to limit testability as more machines simply means more tests and the associated physical limits (and cloud security) constrain test scaling. Coverage attempts to measure but even that is stressed as verification plans define functions to be verified and crosses attempt to connect dependent requirements. Moreover, the coverage definition may be a manual process, which only adds to the problem.

Similarly, locating bugs is becoming increasingly difficult as IC complexity exceeds verification computing power. Existing techniques such as mutation-based testing act merely as an insurance policy. The designer may not know how many runs are needed to achieve appropriate distribution and tests inevitably overlap, which generates questions as to how the ranking helps complex verification. Determining what tests are critical to assess basic functionality and the possibility of false-positive regression is also possible (e.g. if 1 bit added to the configuration register, etc.). Some customers are often using constrained random test benches that use a constraint solver engine to randomize, which configuration of the design they will run as well as what random data they will want to push through the design to test it.

SUMMARY OF DISCLOSURE

In one or more embodiments of the present disclosure, a computer-implemented method for electronic design verification is provided. The method may include providing, using one or more processors, an electronic design verification environment having a plurality of randomize calls associated therewith. The method may also include selecting one of the plurality of randomize calls for analysis at a constraint solver engine and iteratively analyzing the selected randomize call using a plurality of constraint solver algorithms. The method may also include automatically determining a most effective constraint solver algorithm for the selected randomize call.

One or more of the following features may be included. In some embodiments, the method may further include generating at least one result set indicating the relative effectiveness of each of the plurality of constraint solver algorithms for the selected randomize call and storing the at least one result set. The method may also include automatically determining a proportion of one or more of the plurality of constraint solver algorithms for the selected randomize call. The method may further include applying each of the plurality of constraint solver algorithms in the determined proportion during a simulation. The method may also include selecting the most effective constraint solver algorithm and performing a simulation based upon, at least in part, the stored result set. In some embodiments, iteratively analyzing may include determining a coverage amount created by each of the plurality of constraint solver algorithms.

In one or more embodiments of the present disclosure a computer-readable storage medium having stored thereon instructions, which when executed by a processor result in one or more operations for electronic design verification. Operations may include providing, using one or more processors, an electronic design verification environment having a plurality of randomize calls associated therewith. Operations may also include selecting one of the plurality of randomize calls for analysis at a constraint solver engine and iteratively analyzing the selected randomize call using a plurality of constraint solver algorithms. Operations may also include automatically determining a most effective constraint solver algorithm for the selected randomize call.

One or more of the following features may be included. In some embodiments, operations may further include generating at least one result set indicating the relative effectiveness of each of the plurality of constraint solver algorithms for the selected randomize call and storing the at least one result set. Operations may also include automatically determining a proportion of one or more of the plurality of constraint solver algorithms for the selected randomize call. Operations may further include applying each of the plurality of constraint solver algorithms in the determined proportion during a simulation. Operations may also include selecting the most effective constraint solver algorithm and performing a simulation based upon, at least in part, the stored result set. In some embodiments, iteratively analyzing may include determining a coverage amount created by each of the plurality of constraint solver algorithms.

In some embodiments, a system for electronic design verification is provided. The system may further include one or more processors configured to provide an electronic design verification environment having a plurality of randomize calls associated therewith. The one or more processors may be further configured to select one of the plurality of randomize calls for analysis at a constraint solver engine. The one or more processors may be further configured to iteratively analyze the selected randomize call using a plurality of constraint solver algorithms. The one or more processors may be further configured to automatically determine a most effective constraint solver algorithm for the selected randomize call.

One or more of the following features may be included. In some embodiments, the one or more processors may be further configured to generate at least one result set indicating the relative effectiveness of each of the plurality of constraint solver algorithms for the selected randomize call. The one or more processors may be further configured to store the at least one result set. The one or more processors may be further configured to automatically determine a proportion of one or more of the plurality of constraint solver algorithms for the selected randomize call. The one or more processors may be further configured to apply each of the plurality of constraint solver algorithms in the determined proportion during a simulation. The one or more processors may be further configured to select the most effective constraint solver algorithm and perform a simulation based upon, at least in part, the stored result set.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Some EDA tools, such as those available from the Assignee of the present disclosure, may allow an engineer to run massive verification regressions. Accordingly, these tools may generate a certain distribution of values from the randomize calls in their environment. If the regression was performed with a different constraint solver algorithm then a different distribution would result. The best distribution is the one that matches the coverage model best. Unfortunately, each randomize call in the environment is different so the best algorithm will be different for different calls.

Figure 3:
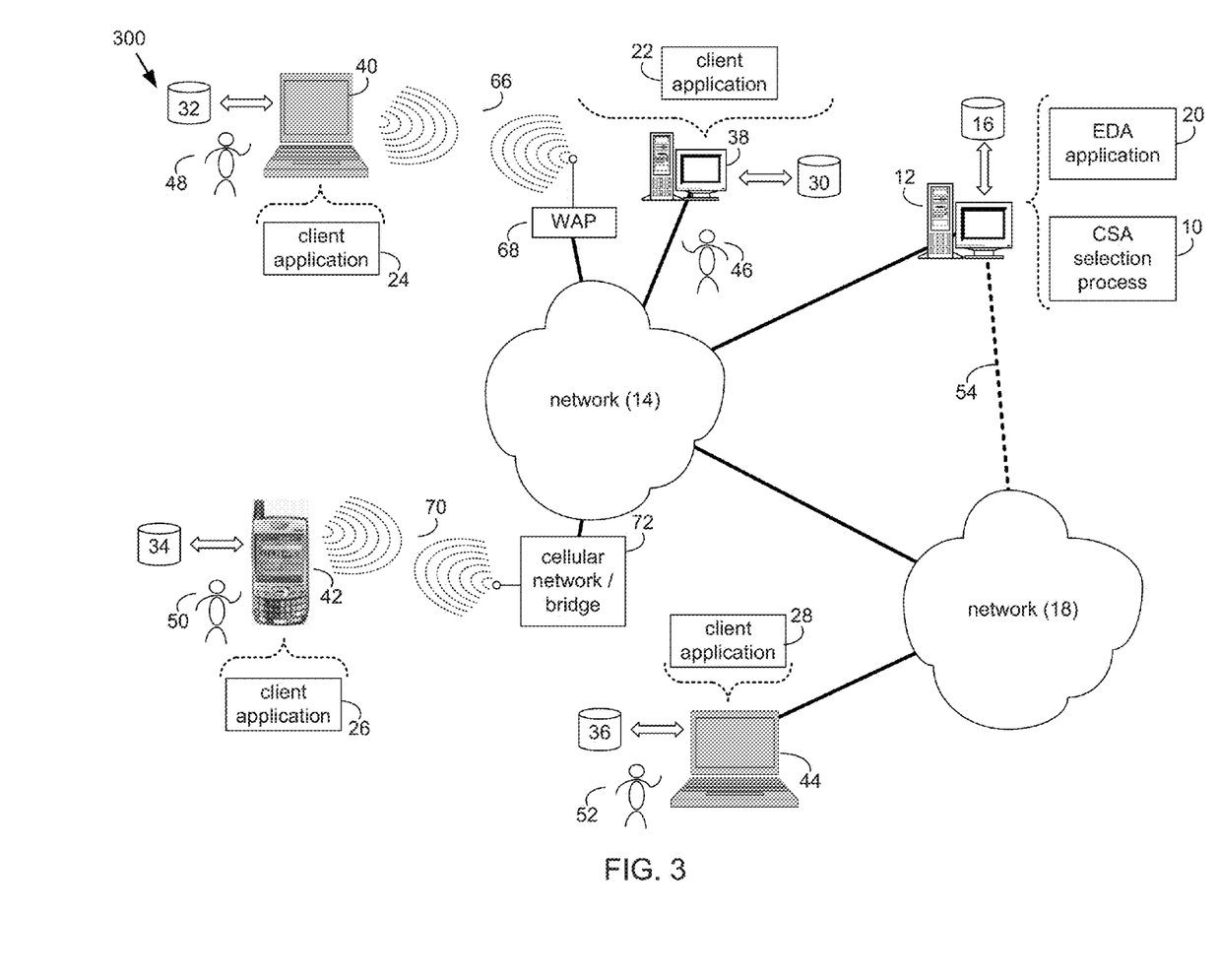
FIG. 3 is a diagram depicting an embodiment of a constraint solver algorithm ("CSA") selection process in accordance with the present disclosure.
Figure 4:
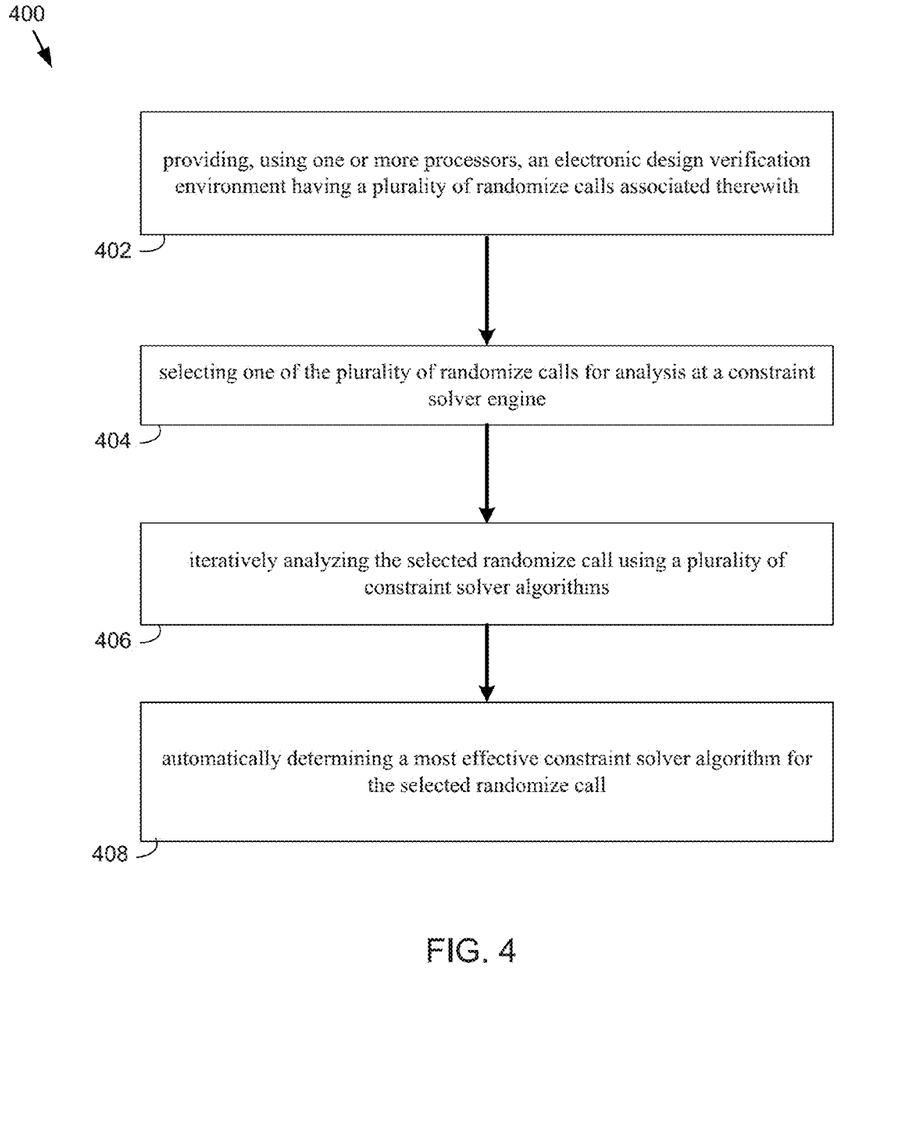
FIG. 4 is a flowchart depicting operations consistent with the CSA selection process in accordance with an embodiment of the present disclosure.
Figure 5:
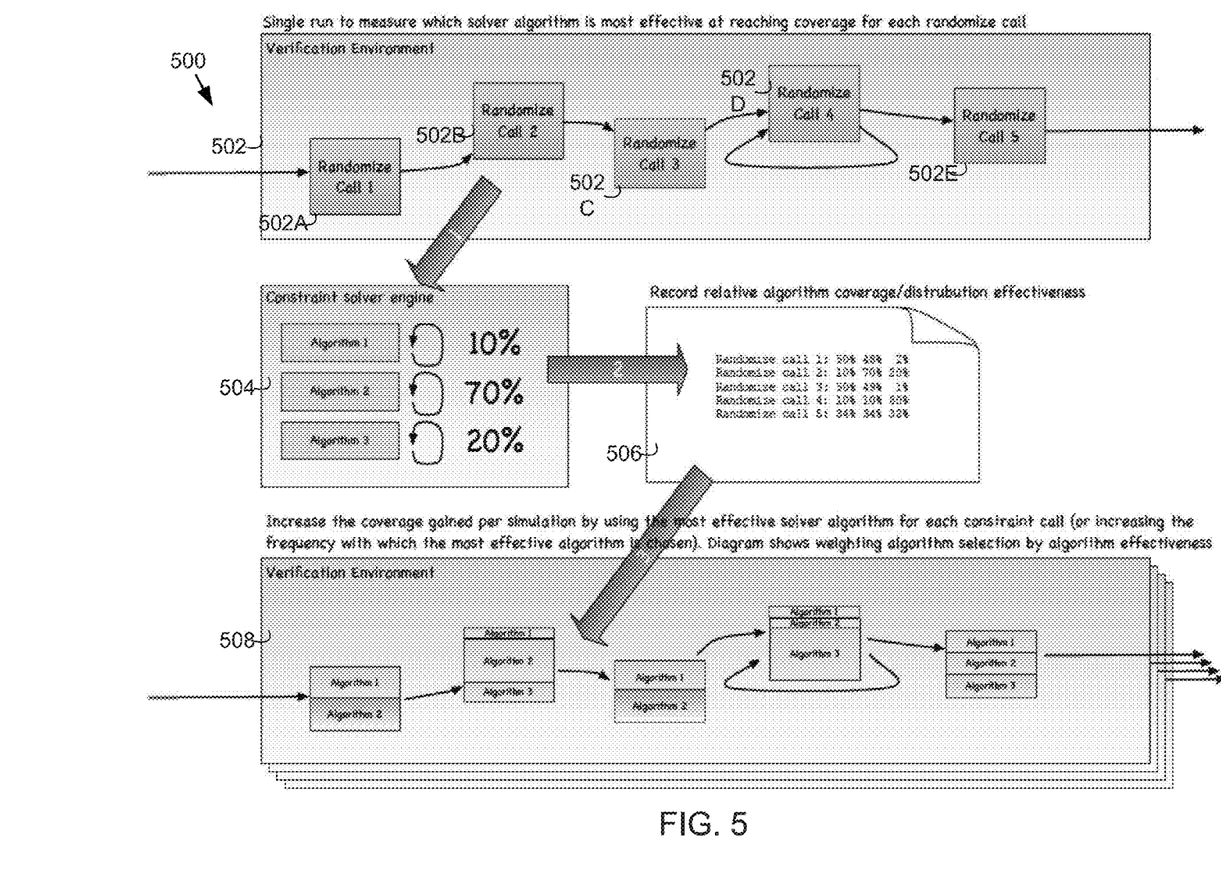
FIG. 5 is a diagram depicting an embodiment of CSA selection process in accordance with the present disclosure.

Referring now to FIGS. 3-5, embodiments of CSA selection process 10, discussed below in further detail, may allow for automatic selection of the most appropriate constraint solver algorithm for use with each randomize call in a particular verification environment. In this way, CSA selection process 10 may be configured to provide a flow to run the simulation (or regression) once. At each randomize call, CSA selection process 10 may iterate many times for each available constraint solver algorithm. CSA selection process 10 may then determine how much coverage (e.g., unique values) is obtained from each algorithm. This may be mapped to both user and automatically generated coverage. The results may be written out and stored so that future simulations know the best constraint solver algorithm to pick for each randomize call (or one algorithm may be run more often for a given call).

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein. "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

As used in any embodiment herein, the terms "simulation" and "verification" may refer to the concept of testing an electronic design and may include any actions performed by a software or hardware engine.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilog and Verilog-AMS. Various other hardware description languages may also be used as well.

Referring to FIG. 3, there is shown a CSA selection process 10 that may reside on and may be executed by server computer 12, which may be connected to network 14 (e.g., the Internet or a local area network, etc.). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server, Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, CSA selection process 10 may reside on and be executed, in whole or in part, by a client electronic device, such as a personal computer, notebook computer, personal digital assistant, or the like.

The instruction sets and subroutines of CSA selection process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain, for example, port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network: or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

CSA selection process 10 may be a stand alone application, or may be an applet/application/script that may interact with and/or be executed within EDA application 20. In addition/as an alternative to being a server-side process. CSA selection process 10 may be a client-side process (not shown) that may reside on a client electronic device (described below) and may interact with an EDA client application (e.g., one or more of EDA client applications 22, 24, 26, 28). Further, CSA selection process 10 may be a hybrid server-side/client-side process that may interact with EDA application 20 and an EDA client application (e.g., one or more of client applications 22, 24, 26, 28). As such, CSA selection process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize CSA selection process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

The term "design" as used herein may refer to, but is not limited to, an integrated circuit design, or any other suitable type of electronic design, such as those associated with electronic design automation tools. For example, an electronic design may refer to a combination of hardware (e.g. described by a hardware description language) and software to implement a range of functions. The function performed by the system may be determined by the way in which the design is configured and the data is presented to the design. Numerous designs may be simulated and any number of engines of various types may be used without departing from the scope of the present disclosure.

In some embodiments, one or more of the designs may be hardware based. Additionally and/or alternatively, one or more of the designs may be software based. For example, the operation of the first design may be a hardware operation and the operation of the second design may be a software operation. Accordingly, CSA selection process 10 may utilize hardware, software and any combination thereof. For example, the control of the configuration may come from either hardware or software. In some embodiments, hybrid hardware/software engines may be both be used without departing from the scope of the present disclosure.

The phrase "randomize call" may refer to its plain and understood meaning as well as to its definition as provided in the SystemVerilog Language Reference Manual. IEEE Standard 1800. It may refer to a built-in virtual method for every class. First, a class may be declared with one or more random variables and optionally one or more constraints on those variables. When the flow of execution reaches the randomize statement in the code, random numbers may be chosen for the random variables in the class being randomized. The random numbers may be chosen to fall within any constraints that have been specified.

By way of example, and in operation, a class may be declared with one or more random variables and optionally one or more constraints on those variables:

```
class C;
    rand int x;
    constraint cnt {x<100;}
endclass: C
```

Then, an instance of that class may be created:

C my_c=new( )

Then, the class instance may be randomized using some process (e.g., a thread, etc.):

initial begin
        assert(my_c.randomize( ));
    end which may run during simulation. It should be noted that any portions of code or pseudocode included herein are provided merely by way of example and are not intended to limit the scope of the present disclosure.

In some embodiments, CSA selection process 10 may uniquely identify the code that generates calls to the constraint solver in the verification environment. These unique identifiers can then be associated with the set of results obtained for that code and the record of the performance of each constraint solver algorithm on each uniquely identified piece of constraint solver calling code. This algorithm performance information may be recorded for each unique identifier. When the simulation is run again the stored algorithm performance information can be used to determine the best algorithm to run or the probability of choosing each algorithm can be determined by its performance for each uniquely identified call to the constraint solver.

Referring now to FIGS. 3-5, embodiments of CSA selection process 10, discussed below in further detail, may allow for automatic selection of the most appropriate constraint solver algorithm for use with each randomize call in a particular verification environment. In this way, CSA selection process 10 may be configured to provide a flow to run the simulation (or regression) once. At each randomize call, CSA selection process 10 may iterate many times for each available constraint solver algorithm. CSA selection process 10 may then determine how much coverage (e.g., unique values) is obtained from each algorithm. This may be mapped to both user and automatically generated coverage. The results may be written out and stored so that future simulations know the best constraint solver algorithm to pick for each randomize call (or one algorithm may be run more often for a given call).

Referring to FIG. 4, an exemplary flowchart 400 depicting operations consistent with CSA selection process 10 is provided. CSA selection process 10 may include providing (402), using one or more processors, an electronic design verification environment having a plurality of randomize calls associated therewith. Embodiments may also include selecting (404) one of the plurality of randomize calls for analysis at a constraint solver engine and iteratively analyzing (406) the selected randomize call using a plurality of constraint solver algorithms. Embodiments may also include automatically determining (408) a most effective constraint solver algorithm for the selected randomize call. CSA selection process 10 may be configured to perform a single run to measure which constraint solver algorithm is the most effective at reaching coverage for each randomize call.

In some embodiments, and as shown in FIG. 5, CSA selection process 10 may include providing (402) an electronic design verification environment 502 having a plurality of randomize calls 502A-E associated therewith. Although five randomize calls are shown in the Figure it should be noted that any number may be used without departing from the scope of the subject application.

In some embodiments, CSA selection process 10 may include selecting (404) one of the plurality of randomize calls (in this example, randomize call 502B) for analysis at a constraint solver engine 504. Any suitable constraint solver engine 504 may be used, such as those available from the Assignee of the subject application.

In some embodiments, CSA selection process 10 may include iteratively analyzing (406) the selected randomize call using a plurality of constraint solver algorithms associated with constraint solver engine 504. This analysis may include determining a coverage amount created by each of the plurality of constraint solver algorithms. For example, algorithm 1 may correspond to an IEEE algorithm while algorithms 2 and 3 may correspond to non-IEEE algorithms. Algorithms of any type and number may be used without departing from the scope of the subject application.

In some embodiments, CSA selection process 10 may be configured to automatically determine (408) a most effective constraint solver algorithm for the selected randomize call. Accordingly, and as shown in FIG. 5, CSA selection process 10 may generate at least one result set 506 indicating the relative effectiveness of each of the plurality of constraint solver algorithms for the selected randomize call. This result set may be stored using any suitable approach, for example using any of the storage devices shown in FIG. 3.

For example, and as shown in FIG. 5, randomize call 2 generated a result set having 10% coverage effectiveness for algorithm 1, 70% coverage effectiveness for algorithm 2, and 20% coverage effectiveness for algorithm 3. Separate results sets, each with differing degrees of effectiveness, were generated for randomize calls, 1, 3, 4, and 5.

In some embodiments, CSA selection process 10 may be configured to increase the coverage gained per simulation by using the most effective constraint solver algorithm for each constraint call. Additionally and/or alternatively, CSA selection process 10 may increase the frequency with which the most effective algorithm is selected.

In this way, and as shown in the verification environment 508 of FIG. 5, CSA selection process 10 may include selecting the most effective constraint solver algorithm and performing a simulation based upon, at least in part, the stored result set. This may include automatically determining a proportion of one or more of the plurality of constraint solver algorithms for the selected randomize call. CSA selection process 10 may be configured to apply each of the plurality of constraint solver algorithms in the determined proportion during a simulation.

In some embodiments, some of the algorithms could give quite different distributions (that are not SystemVerilog LRM compliant). Some algorithms could add solve_before constraints for skewed distributions automatically, which may dramatically improve the generated distribution for certain sets of constraints (e.g., randomize calls).

Embodiments of CSA process 10 may generate high coverage and locate bugs far faster (with fewer simulations) than existing approaches. CSA process 10 may generate random distributions from their coverage models that match the coverage they want (or the coverage that we automatically generate). As a result, the engineer or designer may not need to run another simulator to see if the different constraint solver algorithm finds different bugs or reaches other coverage. The ability to measure and record which algorithm to use for future simulations may dramatically improve the coverage convergence of the environment and the rate at which it catches bugs.

Another example consistent with the teachings of CSA selection process 10 is provided below. In this example, there may be three randomize calls, each identified with a comment (again, the pseudocode listed below is included merely by way of example and is not intended to limit the scope of the present disclosure):

```
package my_package;
class first;
   rand int a;
   rand int b;
   constraint constraint1 { a>=0;}
   constraint constraint2 { a<=1;}
   constraint constraint3 { b>0;}
   constraint constraint4 { b<100;}
endclass//first
class second;
   rand int a;
   rand int b;
   constraint constraint1 { a>=0;}
   constraint constraint2 { a<=1;}
   constraint constraint3 { b>0;}
   constraint constraint4 { b<10;}
   constraint bias {
      if (a==0) b==0;
   }
endclass//second
class third;
   rand int a;
   rand int b;
   constraint constraint1 { a>=0;}
   constraint constraint2 { a<=1;}
   constraint constraint3 { b>0;}
   constraint constraint4 { b<100;}
   constraint bias {
      if (a==0) b==0;
   }
endclass//third
class test;
   first first_h;
   second second_h;
   third third_h;
   task run( );
      first_h=new( );
      second_h=new( );
      third_h=new( );
      if (!first_h.randomize( )) begin//uniquely identified
         randomize call 1 $display("RANDOMIZE
         FAILED");
      end
      $display("Randomize call 1 picked: a %0d b %0d",
         first_h.a, first_h.b);
      if (!second_h.randomize( )) begin//uniquely identi-
         fied randomize call 2 $display("RANDOMIZE
         FAILED");
      end
      $display("Randomize call 2 picked: a %0d b %0d",
         second_h.a, second_h.b);
      for (int loop=0;loop <11;loop++) begin
         if (!third_h.randomize( )) begin//uniquely identi-
            fied randomize call 3
            $display("RANDOMIZE     FAILED")://(even
            though it is called multiple times in a loop)
         end
         $display("Randomize call 3 picked: a %0d b
            %0d", third_h.a, third_h.b);
      end
   endtask//run
endclass//test
endpackage//my_package
module tb_top( );
   import my_package::*;
   test test_h;
   initial begin
      test_h=new( );
      test_h.run( );
   end
endmodule//tb_top
```

The results of running this example once are provided below:

Randomize call 1 picked: a 0 b 71
Randomize call 2 picked: a 1 b 5
Randomize call 3 picked: a 1 b 30
Randomize call 3 picked: a 1 b 26
Randomize call 3 picked: a 1 b 5
Randomize call 3 picked: a 1 b 52
Randomize call 3 picked: a 1 b 93
Randomize call 3 picked: a 1 b 5
Randomize call 3 picked: a 1 b 64
Randomize call 3 picked: a 1 b 91
Randomize call 3 picked: a 1 b 50
Randomize call 3 picked: a 1 b 85
Randomize call 3 picked: a 1 b 71

The results of running this example and stopping and iterating 20 times on each randomize call are provided below:

Randomize call 1 picked: a 1 b 31
Randomize call 1 picked: a 0 b 81
Randomize call 1 picked: a 1 b 30
Randomize call 1 picked: a 0 b 76
Randomize call 1 picked: a 0 b 6
Randomize call 1 picked: a 0 b 95
Randomize call 1 picked: a 0 b 86
Randomize call 1 picked: a 1 b 56
Randomize call 1 picked: a 1 b 99
Randomize call 1 picked: a 1 b 55
Randomize call 1 picked: a 1 b 65
Randomize call 1 picked: a 1 b 8
Randomize call 1 picked: a 1 b 59
Randomize call 1 picked: a 1 b 90
Randomize call 1 picked: a 1 b 9
Randomize call 1 picked: a 0 b 14
Randomize call 1 picked: a 0 b 85
Randomize call 1 picked: a 1 b 16
Randomize call 1 picked: a 1 b 52
Randomize call 1 picked: a 1 b 90
Randomize call 1 picked: a 1 b 89
Randomize call 2 picked: a 1 b 6
Randomize call 2 picked: a 1 b 9
Randomize call 2 picked: a 1 b 1
Randomize call 2 picked: a 1 b 1
Randomize call 2 picked: a 1 b 4
Randomize call 2 picked: a 1 b 2
Randomize call 2 picked: a 1 b 7
Randomize call 2 picked: a 1 b 5
Randomize call 2 picked: a 1 b 5
Randomize call 2 picked: a 1 b 2
Randomize call 2 picked: a 1 b 2
Randomize call 2 picked: a 1 b 2
Randomize call 2 picked: a 1 b 9
Randomize call 2 picked: a 1 b 6
Randomize call 2 picked: a 1 b 1
Randomize call 2 picked: a 1 b 1
Randomize call 2 picked: a 1 b 4
Randomize call 2 picked: a 1 b 8
Randomize call 2 picked: a 1 b 9
Randomize call 2 picked: a 1 b 5
Randomize call 2 picked: a 1 b 7
Randomize call 3 picked: a 1 b 66
Randomize call 3 picked: a 1 b 34
Randomize call 3 picked: a 1 b 91

Randomize call 3 picked: a 1 b 47
Randomize call 3 picked: a 1 b 78
Randomize call 3 picked: a 1 b 31
Randomize call 3 picked: a 1 b 10
Randomize call 3 picked: a 1 b 32
Randomize call 3 picked: a 1 b 27
Randomize call 3 picked: a 1 b 42
Randomize call 3 picked: a 1 b 10
Randomize call 3 picked: a 1 b 21
Randomize call 3 picked: a 1 b 46
Randomize call 3 picked: a 1 b 63
Randomize call 3 picked: a 1 b 68
Randomize call 3 picked: a 1 b 17
Randomize call 3 picked: a 1 b 65
Randomize call 3 picked: a 1 b 70
Randomize call 3 picked: a 1 b 48
Randomize call 3 picked: a 1 b 45

In the second and third randomize call there is a bias away from a=0 because a only becomes 0 if b is randomly picked as 0 as well.

Additionally and/or alternatively, if a constraint solver algorithm is selected that automatically inserts a solve before in this type of example the following results may be generated:

Randomize call 1 picked: a 1 b 85
Randomize call 1 picked: a 0 b 62
Randomize call 1 picked: a 0 b 13
Randomize call 1 picked: a 0 b 8
Randomize call 1 picked: a 1 b 1
Randomize call 1 picked: a 1 b 2
Randomize call 1 picked: a 0 b 20
Randomize call 1 picked: a 1 b 18
Randomize call 1 picked: a 0 b 60
Randomize call 1 picked: a 0 b 49
Randomize call 1 picked: a 1 b 14
Randomize call 1 picked: a 1 b 26
Randomize call 1 picked: a 0 b 10
Randomize call 1 picked: a 0 b 15
Randomize call 1 picked: a 1 b 80
Randomize call 1 picked: a 0 b 30
Randomize call 1 picked: a 0 b 14
Randomize call 1 picked: a 0 b 77
Randomize call 1 picked: a 0 b 4
Randomize call 1 picked: a 0 b 46
Randomize call 1 picked: a 0 b 61
Randomize call 2 picked: a 0 b 8
Randomize call 2 picked: a 0 b 6
Randomize call 2 picked: a 0 b 6
Randomize call 2 picked: a 1 b 2
Randomize call 2 picked: a 1 b 6
Randomize call 2 picked: a 1 b 5
Randomize call 2 picked: a 0 b 8
Randomize call 2 picked: a 0 b 3
Randomize call 2 picked: a 1 b 5
Randomize call 2 picked: a 1 b 1
Randomize call 2 picked: a 0 b 9
Randomize call 2 picked: a 0 b 6
Randomize call 2 picked: a 0 b 1
Randomize call 2 picked: a 0 b 3
Randomize call 2 picked: a 0 b 6
Randomize call 2 picked: a 1 b 8
Randomize call 2 picked: a 0 b 2
Randomize call 2 picked: a 0 b 2
Randomize call 2 picked: a 0 b 5
Randomize call 2 picked: a 1 b 8
Randomize call 2 picked: a 1 b 4
Randomize call 3 picked: a 1 b 77
Randomize call 3 picked: a 1 b 53
Randomize call 3 picked: a 1 b 86
Randomize call 3 picked: a 1 b 83
Randomize call 3 picked: a 0 b 76
Randomize call 3 picked: a 1 b 29
Randomize call 3 picked: a 0 b 42
Randomize call 3 picked: a 0 b 70
Randomize call 3 picked: a 1 b 12
Randomize call 3 picked: a 0 b 43
Randomize call 3 picked: a 1 b 91
Randomize call 3 picked: a 0 b 64
Randomize call 3 picked: a 0 b 8
Randomize call 3 picked: a 0 b 73
Randomize call 3 picked: a 0 b 32
Randomize call 3 picked: a 0 b 26
Randomize call 3 picked: a 1 b 67
Randomize call 3 picked: a 0 b 90
Randomize call 3 picked: a 0 b 67
Randomize call 3 picked: a 1 b 38

Accordingly, CSA selection process 10 may be configured to increase the coverage and number of unique values seen for certain sets of constraints by choosing different constraint solver algorithms.

In some embodiments, the relative effectiveness of each algorithm may be calculated from the result set and that calculated effectiveness stored. The effectiveness of the algorithm may be calculated from the increase in coverage (e.g., user generated, automatically generated, etc.) or from the proportion of unique value sets generated for the random variables in the constraint solve call. CSA process 10 may also include automatically determining a proportion of one or more of the plurality of constraint solver algorithms for the selected randomize call based upon, at least in part the stored result set or the calculated effectiveness. CSA process 10 may further include applying each of the plurality of constraint solver algorithms in the determined proportion during a simulation. CSA process 10 may also include selecting the most effective constraint solver algorithm and performing a simulation based upon, at least in part, the stored result set or the calculated effectiveness. In some embodiments, iteratively analyzing may include determining a coverage amount created by each of the plurality of constraint solver algorithms.

In some embodiments, CSA process 10 may be configured to store a result set for each algorithm and then determine which provided the most unique values. Additionally and/or alternatively, in some embodiments, CSA process 10 may be configured to run a certain number of iterations then see how the coverage had increased (e.g. see how the coverage counters looking at the numbers had incremented. In some embodiments iteratively analyzing may include determining the proportion of unique results obtained from iteratively running the solver on each algorithm.

Embodiments may also include determining the most effective algorithm for each randomize call in the verification environment. Embodiments may also include using the results from each uniquely identified randomize call to determine the best algorithms to run for each randomize call in an environment.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design verification comprising:
providing, using one or more processors, an electronic design verification environment having a plurality of randomized calls associated therewith;
selecting one of the plurality of randomized calls for analysis at a constraint solver engine;
iteratively analyzing the selected randomized call using a plurality of constraint solver algorithms;
automatically determining a most effective constraint solver algorithm for the selected randomized call; and
generating at least one result set indicating relative effectiveness of each of the plurality of constraint solver algorithms for the selected randomized call.

2. The computer-implemented method of claim 1, further comprising:
storing the at least one result set.

3. The computer-implemented method of claim 2, further comprising:
selecting the most effective constraint solver algorithm and performing a simulation based upon, at least in part, the stored at least one result set.

4. The computer-implemented method of claim 1, further comprising:
automatically determining a proportion of each of two or more of the plurality of constraint solver algorithms for the selected randomized call.

5. The computer-implemented method of claim 4, further comprising:
applying each of said two or more of the plurality of constraint solver algorithms in the determined proportion during a simulation.

6. The computer-implemented method of claim 1, wherein the iteratively analyzing includes determining a coverage amount created by each of the plurality of constraint solver algorithms.

7. A non-transitory computer-readable storage medium for electronic design verification, the non-transitory computer-readable storage medium having stored thereon instructions that, when executed by a machine, result in one or more operations, the operations comprising:
providing, using one or more processors, an electronic design verification environment having a plurality of randomized calls associated therewith;
selecting one of the plurality of randomized calls for analysis at a constraint solver engine;
iteratively analyzing the selected randomized call using a plurality of constraint solver algorithms;
automatically determining a most effective constraint solver algorithm for the selected randomized call; and
generating at least one result set indicating relative effectiveness of each of the plurality of constraint solver algorithms for the selected randomized call.

8. The non-transitory computer-readable storage medium of claim 7, further comprising:
storing the at least one result set.

9. The non-transitory computer-readable storage medium of claim 8, further comprising:
selecting the most effective constraint solver algorithm and performing a simulation based upon, at least in part, the stored at least one result set.

10. The non-transitory computer-readable storage medium of claim 7, further comprising:
automatically determining a proportion of each of two or more of the plurality of constraint solver algorithms for the selected randomized call.

11. The non-transitory computer-readable storage medium of claim 10, further comprising:
applying each of said two or more of the plurality of constraint solver algorithms in the determined proportion during a simulation.

12. The non-transitory computer-readable storage medium of claim 7, wherein the iteratively analyzing includes determining a coverage amount created by each of the plurality of constraint solver algorithms.

13. A system for electronic design verification comprising:
one or more processors configured to provide an electronic design verification environment having a plurality of randomized calls associated therewith, the one or more processors further configured to select one of the plurality of randomized calls for analysis at a constraint solver engine, the one or more processors further configured to iteratively analyze the selected randomized call using a plurality of constraint solver algorithms, the one or more processors further configured to automatically determine a most effective constraint solver algorithm for the selected randomized call, the one or more processors are further configured to generate at least one result set indicating relative effectiveness of each of the plurality of constraint solver algorithms for the selected randomized call.

14. The system of claim 13, wherein the one or more processors are further configured to store the at least one result set.

15. The system of claim 14, wherein the one or more processors are further configured to select the most effective constraint solver algorithm and perform a simulation based upon, at least in part, the stored at least one result set.

16. The system of claim 13, wherein the one or more processors are further configured to automatically determine a proportion of each of two or more of the plurality of constraint solver algorithms for the selected randomized call.

17. The system of claim 16, wherein the one or more processors are further configured to apply each of said two or more of the plurality of constraint solver algorithms in the determined proportion during a simulation.

* * * * *